H. ROSE.
SLACK ADJUSTER.
APPLICATION FILED JUNE 6, 1914.

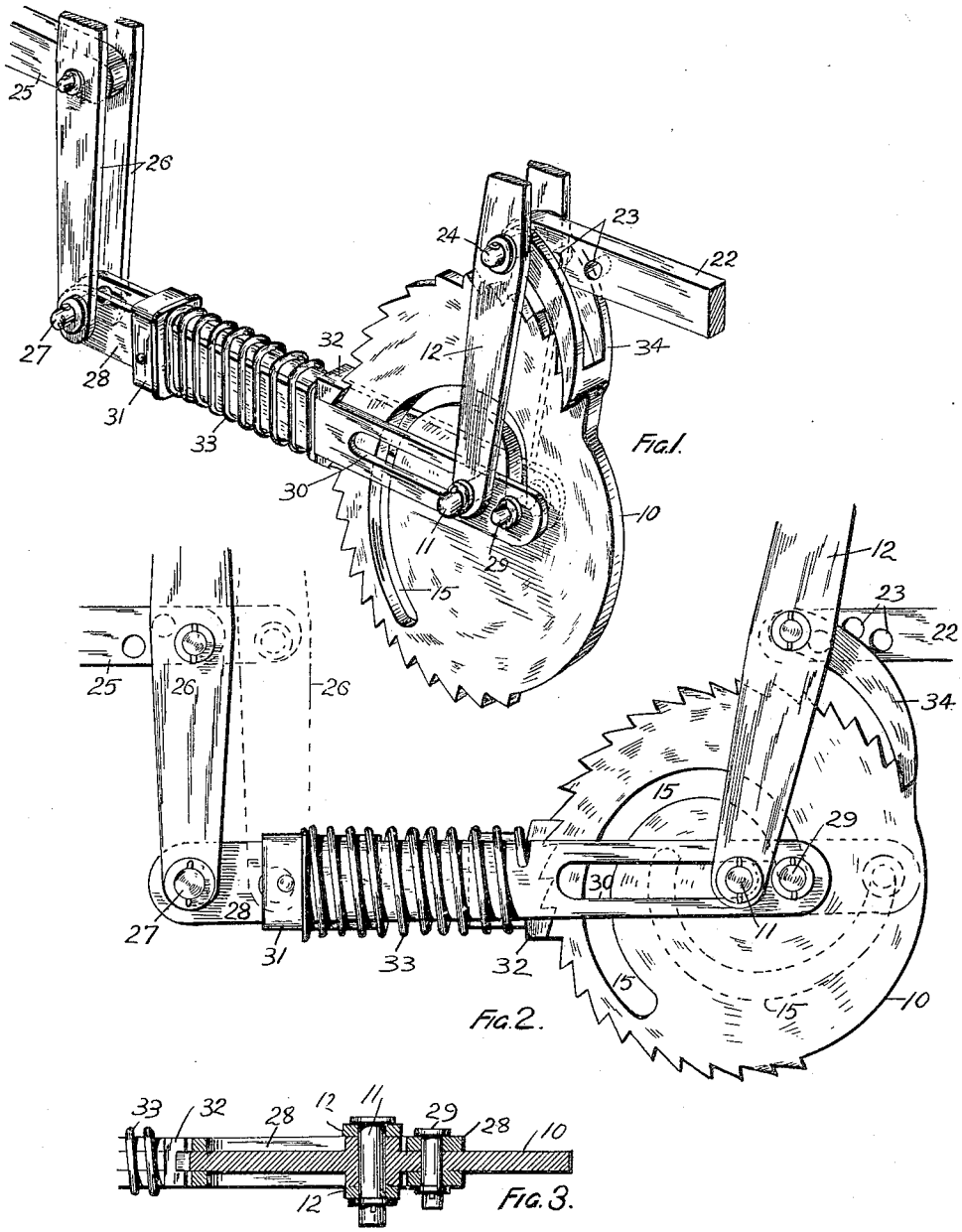

1,144,866.

Patented June 29, 1915.
3 SHEETS—SHEET 2.

WITNESSES

INVENTOR
HUGH ROSE
BY
ATTORNEYS

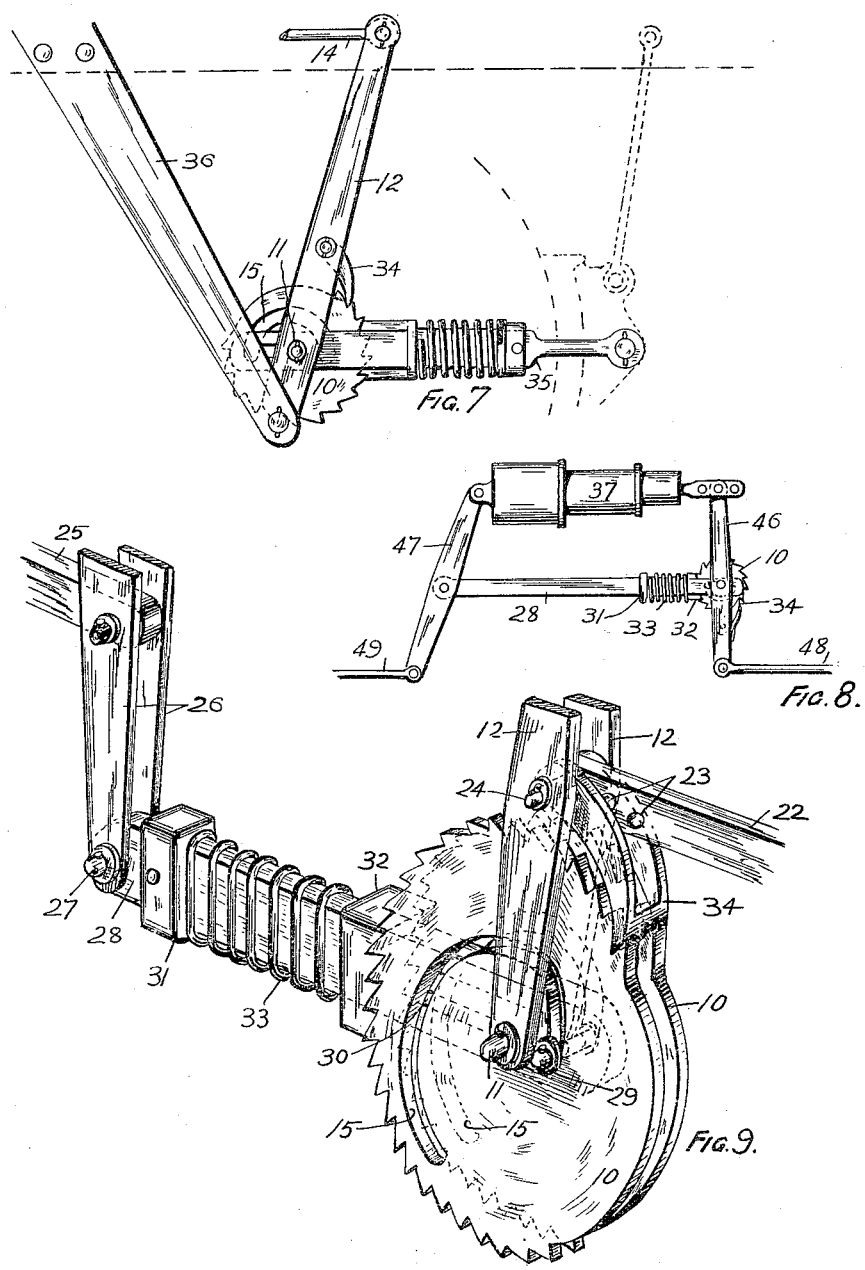

UNITED STATES PATENT OFFICE.

HUGH ROSE, OF STANMORE, NEW SOUTH WALES, AUSTRALIA.

SLACK-ADJUSTER.

1,144,866.  Specification of Letters Patent.  Patented June 29, 1915.

Application filed June 6, 1914. Serial No. 843,520.

*To all whom it may concern:*

Be it known that I, HUGH ROSE, a subject of the King of Great Britain and Ireland, and resident of "Yonka," Holt street, Stanmore, in the State of New South Wales, Commonwealth of Australia, have invented certain new and useful Improvements in Slack-Adjusters; and I do hereby declare that the following is a full, clear, and exact description of the same.

The "slack" of brakes is the amount of play between the brake shoes and the wheel tires when the former are hanging free, and it is obvious that as the shoes wear away by friction the amount of slack increases and the movement of the pull-rod and links required to bring the shoes into contact with the tires increases proportionately to the wear.

The object of this invention is to provide a more simple and positive yet equally efficient slack adjuster involving the use of a ratchet wheel but not employing screw gear. And according to this invention the said ratchet wheel is independent of the brake cylinder (thus rendering the device applicable also to hand brakes if desired) being mounted in the link and lever system of the brake mechanism and engaged by a pawl and having within, upon, or connected to it an eccentrically disposed cam surface engaging an adjusting link connected to an element of the said system, abnormal movement of the main operating lever causing the said pawl to rotate the ratchet wheel and the cam surface, whereby the effective length of the adjusting link is reduced and the slack taken up automatically as required. I have found that in practice the said cam surface preferably consists of a slot eccentrically disposed or constituting a substantially involute curve within the periphery of the wheel, and this construction is illustrated in the accompanying drawings forming part of this specification, which also show practical means of carrying the invention into effect and to which I will now refer:—

Figure 4:
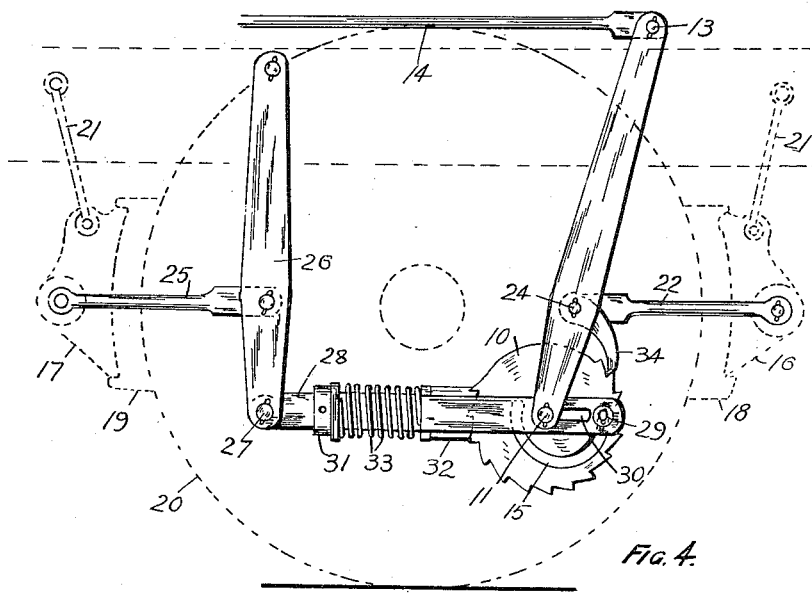
Figure 5:
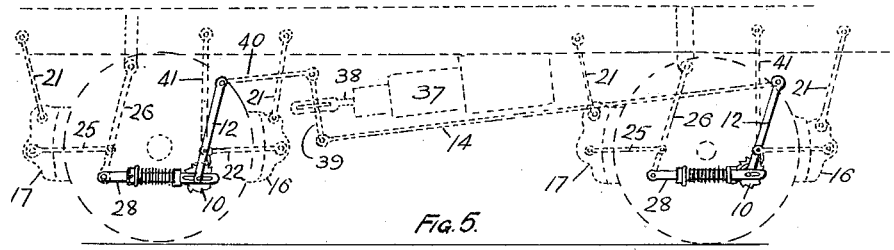
Figure 6:
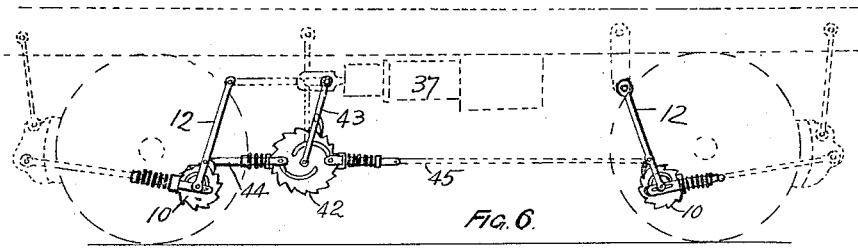

Figure 1 is a perspective view showing the ratchet wheel, the adjusting link, and their immediate attachments as adapted for "clasp" brakes, the parts being shown in the normal position, that is to say set to give the desired or normal amount of slack. Fig. 2 is a side elevation of Fig. 1. Fig. 3 is a sectional plan through the ratchet wheel and part of the adjusting link. Fig. 4 is a diagrammatic side elevation showing more completely the lever system and the pull-rod, the parts being shown in the positions they would occupy when the automatic adjustment has reached its limit and the brake system requires resetting or new shoes. Fig. 5 is a diagrammatic view showing an arrangement of parts for the application of the invention to a double system of clasp brakes. Fig. 6 is a diagrammatic view showing the invention applied to a clasp brake engaging two separate wheels and the introduction of an additional ratchet wheel having two slots. Fig. 7 is a diagrammatic view showing a simple application of the invention to single brakes, with the parts relatively in the same positions as in Fig. 3. Fig. 8 illustrates diagrammatically an arrangement of the wheel device more closely to the air brake cylinder. Fig. 9 illustrates the arrangement as in Fig. 1, but showing a duplex ratchet wheel and the adjusting link passing between the members of same.

Referring to Figs. 1 to 4 inclusive:—The ratchet wheel 10 is pivotally mounted on pin 11 between the lower extremities of the limbs of the main brake lever 12 which at its upper end is pivoted at 13 to the pull-rod 14 connected to the brake operating mechanism (not shown), and within said wheel is the curved slot 15 forming a substantially involute curve. Brake blocks 16 and 17 are fitted respectively with brake shoes 18 and 19 adapted to bear upon the tread of the wheel 20 and are suspended in the usual manner by links 21. 21. from the vehicle underframe.

To the brake block 16 is pivotally connected the pull link 22 which at its other end is pivotally connected to main lever 12, a series of pin holes 23. 23. being provided for manual adjustment purposes, either of said holes being adapted to engage the pivot pin 24. And the brake block 17 is pivotally attached to link 25 which at its other end is pivotally connected to lever 26 pivoted at its upper end to the vehicle underframe and at its lower end at 27 to the adjusting link 28. The latter extends horizontally to the ratchet wheel 10 being bifurcated to pass on each side of same, and a pin 29 joining the extremities of the limbs registers through the curved slot 15, while a slot 30 in each of said limbs and through which registers the pin 11 permits longitudinal movement of the link 28 relatively to said pin 11.

On the adjusting link 28 is affixed a collar 31 and a sliding stop-pawl 32 adapted to engage the teeth of the wheel 10, being pressed into such engagement by the coil spring 33 about said link. And to the main lever 12 is pivoted the operating pawl 34 adapted to engage the teeth of the ratchet wheel 10.

In Fig. 5 the same parts as have hereinbefore been described with reference to Figs. 1 to 4 inclusive, are shown, in addition to the air brake cylinder 37 the piston rod 38 of which has a cross-head 39 to one end of which is attached the pull-rod 14 while to the other end is attached the rod 40 which in applying the brakes is a push-rod, and for safety each ratchet wheel 10 is pivotally suspended on a link 41.

In Fig. 6 the construction is substantially a duplication of that shown in Fig. 5 except that the brakes clasp two separate wheels, and there is provided an additional ratchet wheel 42 having two curved slots, pivoted on a lever 43 the top of which is pivoted to the piston rod of the air cylinder 37, and from the said wheel 42 lead two adjusting links 44 and 45 the latter also constituting the pull-rod of one brake system. This construction provides a multiplication of the automatic adjustment mechanism, and furnishes greater scope for its operation.

In Fig. 7 the brake block link 35 itself constitutes the adjusting link, and the ratchet wheel 10 is pivoted to the main lever 12 at a point 11 in line with said link which is bifurcated and slotted to permit longitudinal movement as before while the lower extremity of the main lever is pivoted to a fixed strut 36 dependent from the vehicle underframing.

In Fig. 8 the ratchet wheel 10 is arranged on the floating lever 46 attached to the piston rod of brake cylinder 37, and the adjusting link 28 is connected to the floating lever 47 pivoted rearwardly of the said cylinder, and these two levers are connected respectively to pull-rods 48 and 49.

In Fig. 9 it will be seen that the ratchet wheel is composed of two cheeks 10. 10. between which passes the adjusting link 28.

Assuming the brakes to be adjusted to have a normal amount of slack, and the parts in the position shown in Figs. 1, 2 and 3, repeated application of the brakes will wear the shoes and increase the slack, this necessitating greater movement of the operating lever 12 to apply the brakes. Should this movement of lever 12 become sufficient to cause the pawl 34 to engage a succeeding tooth the return movement of the lever will cause partial rotation of the ratchet wheel, with the result that by the eccentricity of the slot 15 the pin 29 is moved farther away from the pin 11 thereby reducing the effective length of the adjusting link 28 and consequently the distance between the brake shoes. The stop pawl 32 retains the wheel 10 in the position now occupied and on the succeeding applications of the brakes the same operation is repeated if the movement of lever 12 is sufficient to cause the pawl 34 to engage another tooth. Should the movement not be sufficient no further rotation of wheel 10 occurs until further wear of the shoes involves abnormal movement of the lever 12. The adjustment will be automatically repeated until the parts assume the positions shown by dotted lines in Fig. 2 and in full lines in Fig. 4.

The operation in regard to Figs. 5, 6 and 7 will be readily understood from the foregoing.

What I claim and desire to secure by Letters Patent is:—

1. In a brake lever system, a brake lever, a ratchet wheel journaled in one end of the brake lever, and provided with a cam slot, a pawl carried by the lever and engaging the ratchet wheel to rotate the same, an adjusting link having a pin at one end engaging said cam slot, and a longitudinal slot in said adjusting link adjacent said end, through which the journal pin of the ratchet wheel extends, and a stop pawl mounted to slide on the adjusting link and engaging said ratchet wheel.

2. In a slack adjuster for brakes the combination with the brake blocks, of a ratchet wheel having an eccentrically curved slot, an adjusting link having a pin at one end engaging said slot, a brake lever in which said ratchet wheel is mounted to turn, a pawl carried by said lever and engaging the ratchet wheel to rotate the same, the said adjusting link having a longitudinal slot through which the journal pin of the ratchet wheel extends, a second lever pivotally connected with the other end of said adjusting link, link connections between the said levers and the brake shoes, a stop pawl mounted to slide on the adjusting link and adapted to engage the teeth of the ratchet wheel, and a spring held on said adjusting link and bearing on the said stop pawl.

3. In an automatic slack adjuster for brakes, the combination with the brakes, and operating levers therefor, of adjusting links associated with the brakes, ratchet wheels journaled in the levers, and provided with cam slots, each adjusting link being provided with a longitudinal slot adjacent one end through which the journal pin of a ratchet wheel extends, the adjusting link having at said end a pin engaging the cam slot of said ratchet wheel, the said ratchet wheels acting on the adjusting links to adjust the same whereby the slack on the brake shoes is taken up, pawls carried by the operating levers for actuating the ratchet wheels automatically as the brake shoes wear, and spring pressed stop pawls mounted to slide on the adjusting links and engaging the ratchet wheels.

4. An automatic slack adjuster for brakes, comprising a brake lever, a ratchet wheel journaled in one end of the brake lever and provided with a cam slot, a pawl carried by the lever and engaging the ratchet wheel to rotate the same, an adjusting link having a longitudinal slot adjacent one end through which the journal pin of the ratchet wheel extends, the said adjusting link being provided at said end with a pin engaging the said cam slot, a collar on the adjusting link, a stop pawl mounted to slide on the adjusting link, and a coil spring on said adjusting link and bearing against the collar and the said stop pawl.

5. In an automatic slack adjuster for brakes, a brake lever, a ratchet wheel journaled between the lower ends of the members of the brake lever and provided with a cam slot, an operating pawl pivoted to the operating lever and engaging the teeth of said ratchet wheel at one side thereof to rotate the ratchet wheel, a bifurcated adjusting link, the members of which extend on each side of the ratchet wheel, the adjusting link having a longitudinal slot adjacent one end through which the journal pin of the ratchet wheel extends, the said adjusting link being provided at said end with a pin connecting the members of said link and engaging the said cam slot, a stop pawl carried by the adjusting link and engaging the teeth of the ratchet wheel at the other end thereof, and a spring coiled around the members of the adjusting link and pressing on the said stop pawl.

6. In an automatic slack adjuster for brakes, the combination with the operating lever, and an adjusting link adjustably connected with said lever, of a pawl bifurcated at one end, a pivot pin connecting the members of the pawl with the operating lever, adjusting means connected with one end of the adjusting link and actuated by said pawl to adjust the adjusting link, a link extending between the members of the pawl and adjustably mounted on the pivot of said pawl, and a brake block connected with said link.

7. In an automatic slack adjuster for brakes, the combination with the brake blocks, the operating lever, and an adjusting link adjustably connected at one end with the said lever, of a pawl bifurcated at its upper end, a pivot pin connecting the members of the pawl with the operating lever, adjusting means connected with one end of the adjusting link and actuated by said pawl to adjust the adjusting link, a lever connected with the other end of said adjusting link, a link connected with said last mentioned lever, and a link extending between the members of said pawl and mounted on the pivot pin of said pawl, the said links being connected with the brake blocks.

Signed at Sydney, New South Wales, this 29th day of April A. D. 1914.

HUGH ROSE.

Witnesses:
WM. NEWTON,
CHAS. HATTON.

Copies of this patent may be obtained for five cents each, by addressing the "Commissioner of Patents, Washington, D. C."